(12) United States Patent
Nam et al.

(10) Patent No.: US 12,451,792 B2
(45) Date of Patent: *Oct. 21, 2025

(54) POWER SUPPLY DEVICE AND DISPLAY DEVICE INCLUDING THE SAME

(71) Applicant: SAMSUNG DISPLAY CO., LTD., Yongin-si (KR)

(72) Inventors: Yang Uk Nam, Yongin-si (KR); Sung Chun Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,366

(22) Filed: Jun. 5, 2024

(65) Prior Publication Data

US 2024/0322665 A1 Sep. 26, 2024

Related U.S. Application Data

(63) Continuation of application No. 17/825,825, filed on May 26, 2022, now Pat. No. 12,027,961.

(30) Foreign Application Priority Data

Nov. 12, 2021 (KR) .......................... 10-2021-0155898

(51) Int. Cl.
*G09G 5/00* (2006.01)
*G06F 1/3206* (2019.01)
(Continued)

(52) U.S. Cl.
CPC ........ *H02M 1/0032* (2021.05); *G06F 1/3206* (2013.01); *G06F 1/3265* (2013.01); *G06F 1/3296* (2013.01); *H02M 3/1582* (2013.01)

(58) Field of Classification Search
CPC . H02M 1/0032; H02M 3/1582; G06F 1/3206; G06F 1/3265; G06F 1/3296
(Continued)

(56) References Cited

U.S. PATENT DOCUMENTS

| 6,559,624 B1 * | 5/2003 | Hong ................. H02M 3/1563 323/280 |
| 9,935,492 B2 | 4/2018 | Smith |

(Continued)

FOREIGN PATENT DOCUMENTS

| KR | 10-1868207 | 7/2018 |
| KR | 10-2020-0070820 | 6/2020 |

*Primary Examiner* — Jennifer T Nguyen
(74) *Attorney, Agent, or Firm* — F. CHAU & ASSOCIATES, LLC

(57) ABSTRACT

A DC-DC converter includes a first converter outputting a first power voltage in a first driving method of generating an inductor current by alternately turning on transistors in a normal mode and outputting the first power voltage in a second driving method of generating the inductor current with the number of turn-on times less than that of the first driving method in a power saving mode, a second converter outputting a second power voltage in a third driving method of generating the inductor current with the number of turn-on times less than that of the second driving method in the power saving mode and determining differently magnitudes of the second power voltage in the power saving mode and the second power voltage in the normal mode, and a mode selector supplying a mode control signal to the converters to drive the converters according to one of the modes.

20 Claims, 17 Drawing Sheets

(51) Int. Cl.
  *G06F 1/3234*  (2019.01)
  *G06F 1/3296*  (2019.01)
  *H02M 1/00*  (2006.01)
  *H02M 3/158*  (2006.01)

(58) Field of Classification Search
  USPC ........................................................ 345/211
  See application file for complete search history.

(56)  References Cited

U.S. PATENT DOCUMENTS

| | | | |
|---|---|---|---|
| 11,062,651 B2 | 7/2021 | Kim et al. | |
| 12,027,961 B2 * | 7/2024 | Nam | G06F 1/3206 |
| 2005/0242772 A1 * | 11/2005 | Cha | H02J 7/34 |
| | | | 320/115 |
| 2019/0172379 A1 * | 6/2019 | Park | G09G 3/20 |
| 2022/0393593 A1 | 12/2022 | Fukushima et al. | |
| 2023/0046982 A1 * | 2/2023 | Murakami | H02M 1/0009 |
| 2023/0155474 A1 | 5/2023 | Nam et al. | |
| 2023/0344338 A1 * | 10/2023 | Haas | H02M 1/0019 |

* cited by examiner

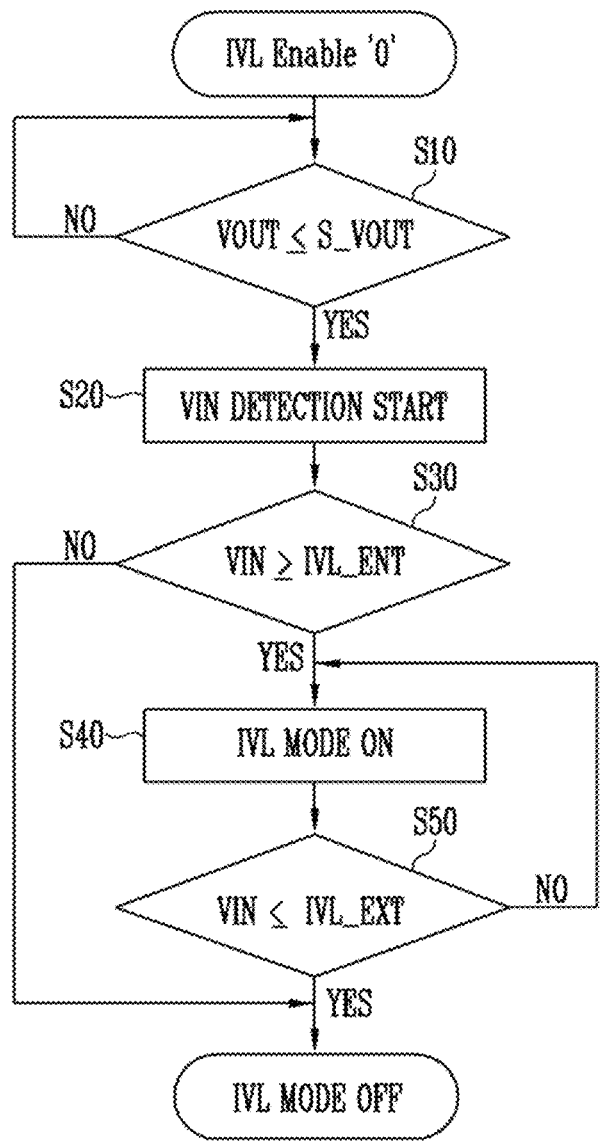

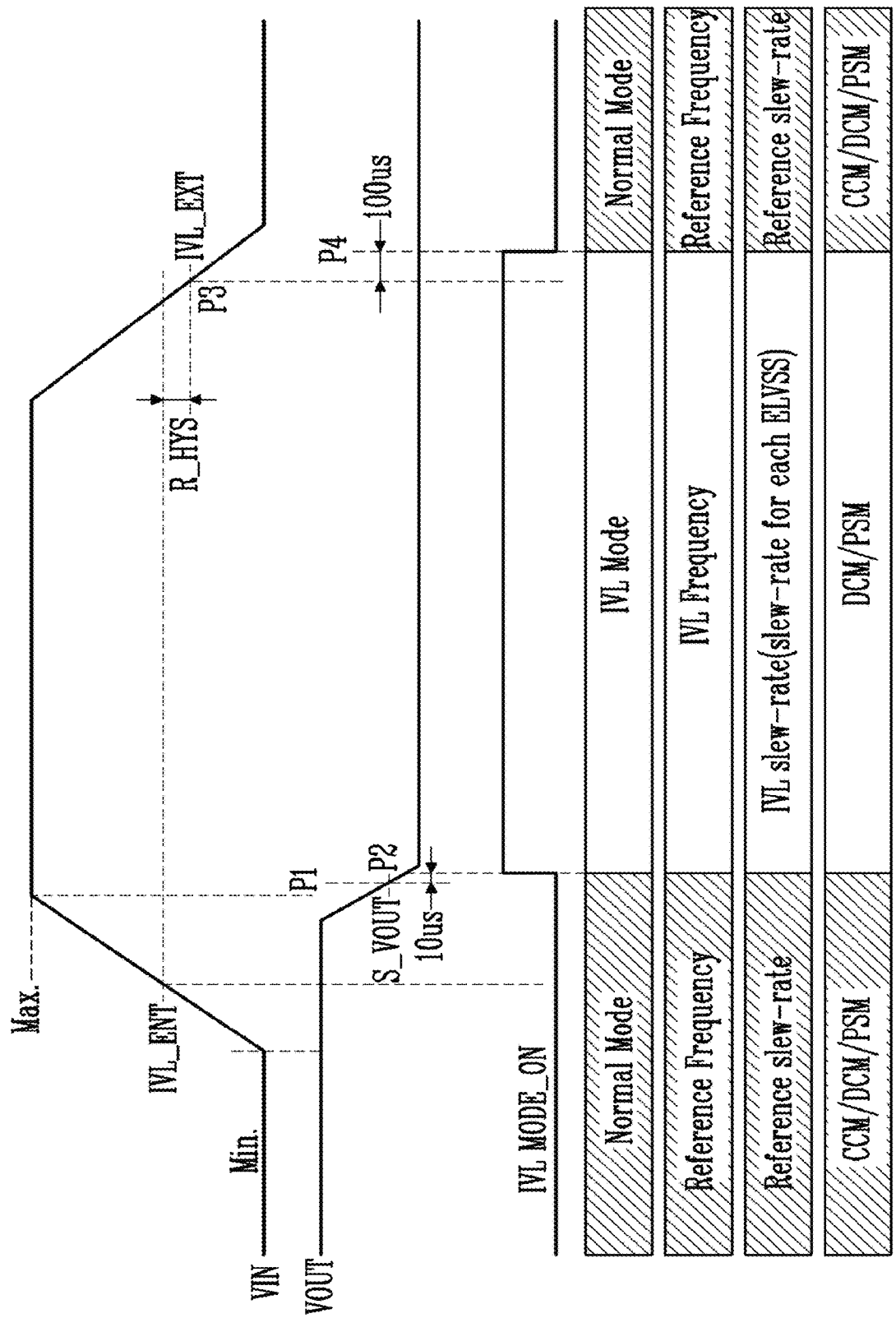

FIG. 7

| Register name | Description | Note |
|---|---|---|
| IVL Enable | 0: IVL on, 1:IVL off | |
| IVL option | 0: VIN≥IVL_ENT & VOUT<IVL_LV1, 1: Only VIN ≥ IVL_ENT | |
| IVL_ENT | (ex) 00: 18.5V, 01: 19V, 10: 19.5V, 11: 20V | |
| IVL_EXT | (ex) 00: 17.5V, 01: 18V, 10: 18.5V, 11: 19V | |
| IVL_LV1 | (ex) 00: −7.0V, 01: −7.5V, 10: −8.0V, 11: −8.5V | |
| IVL_LV2 | (ex) 00: −7.0V, 01: −7.5V, 10: −8.0V, 11: −8.5V | |
| IVL1 Slew-rate | (ex) 00: Fastest, 01: Fast, 10: Slow, 11: Slowest | VOUT ≤ IVL_LV1 |
| IVL2 Slew-rate | (ex) 00: Fastest, 01: Fast, 10: Slow, 11: Slowest | VOUT ≤ IVL_LV2 |
| IVL1 deglitch time | (ex) 00: 0us, 01: 10us, 10: 50us, 11: 100us | |
| IVL2 deglitch time | (ex) 00: 0us, 01: 100us, 10: 500us, 11: 1000us | |
| IVL Frequency | (ex) 00: 450kHz, 01: 600kHz, 10: 750kHz, 11: 900kHz | |

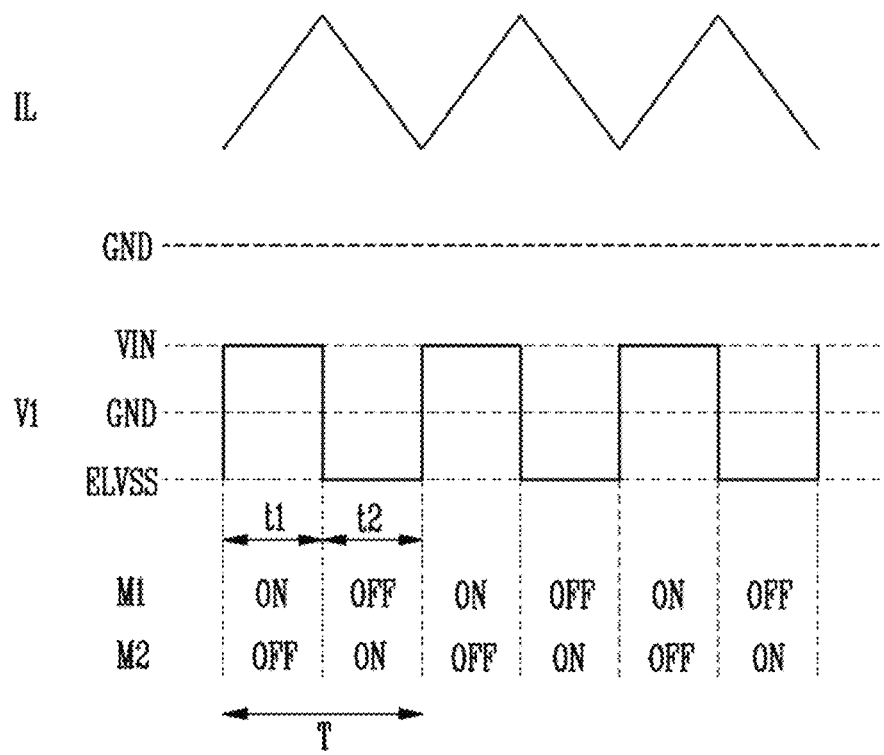

FIG. 10

|  | Min. On BV [V] | Min. Off BV [V] | RSP [mΩ/mm2] |
|---|---|---|---|
| 12V LDMOS | 18 | 21.9 | 4.3 |
| 16V LDMOS | 21.8 | 26.2 | 5.0 |
| 20V LDMOS | 26.8 | 33.4 | 8 |
| 24V LDMOS | 28.8 | 34.8 | 10.6 |
| 30V LDMOS | 45 | 41.6 | 16 |

POWER SUPPLY DEVICE AND DISPLAY DEVICE INCLUDING THE SAME

CROSS-REFERENCE TO RELATED APPLICATION

This application is a continuation application of U.S. patent application Ser. No. 17/825,825 filed May 26, 2022, which claims priority under 35 U.S.C. § 119 to Korean Patent Application No. 10-2021-0155898, filed in the Korean Intellectual Property Office on Nov. 12, 2021, the disclosures of which are incorporated by reference herein in their entirety.

TECHNICAL FIELD

Embodiments of the present disclosure relate to a power supply device and a display device including the same.

DISCUSSION OF RELATED ART

A display device may include a power supply device that converts input power supplied from outside of the display device to generate high potential output power and low potential output power utilized for driving pixels. The power supply device may supply generated positive power and negative power to a display panel of the display device through a power line.

The power supply device may use a boost converter to generate the high potential output power and an inverting buck boost converter to generate the low potential output power. Since the inverting buck boost converter outputs the negative voltage as output power, a level difference between the input power and the output power may be large. Therefore, a withstand voltage applied to switching transistors included in the inverting buck boost converter may be large.

The display device may be an electronic device such as a smartphone and a notebook computer. When the display device is a notebook computer, the input power may have a battery voltage range (for example, about 5.5V to about 17.6V) and an adapter voltage range (for example, about 18V to about 22V) higher than the battery voltage range.

SUMMARY

Embodiments of the present disclosure provide a power supply device and a display device capable of designing switching transistors based on a battery voltage range and withstanding a withstand voltage of the switching transistors also in the adapter voltage range.

Embodiments of the present disclosure provide a power supply device and a display device in which power consumption is decreased and a Y-axis size of a printed circuit board on which the power supply device (for example, a PMIC) is mounted is reduced.

According to embodiments of the present disclosure, a power supply device includes a switch unit including a first transistor disposed between an input terminal receiving input power and a first node, an inductor disposed between the first node and a ground, and a second transistor disposed between the first node and an output terminal outputting output power, a switching controller configured to output a first control signal controlling the first transistor and a second control signal controlling the second transistor based on a control signal and a frequency signal received from a controller, and a mode selector configured to supply a second mode operation signal converting from a first mode to a second mode in which at least one of a driving method, a switching frequency, and a slew rate of the first transistor and the second transistor is variable compared to the first mode to the controller;

In an embodiment, the mode selector compares a voltage level of the input power with a preset start voltage level, and generates the second mode operation signal when the voltage level of the input power is greater than or equal to the start voltage level.

In an embodiment, the input power has a positive voltage level, and has a battery voltage range and an adapter voltage range greater than the battery voltage range.

In an embodiment, the battery voltage range is about 5.5V to about 17.6V, and the adapter voltage range is about 18V to about 22V.

In an embodiment, the mode selector does not generate the second mode operation signal in the battery voltage range.

In an embodiment, the mode selector compares the voltage level of the input power with a preset end voltage level, and stops the second mode operation signal when the voltage level of the input power is less than or equal to the end voltage level.

In an embodiment, the start voltage level is greater than the end voltage level.

In an embodiment, the mode selector generates the second mode operation signal after a first buffer period when the voltage level of the input power is greater than or equal to the start voltage level, and stops the second mode operation signal after a second buffer period when the voltage level of the input power is less than or equal to the end voltage level.

In an embodiment, the first buffer period is shorter than the second buffer period.

In an embodiment, the mode selector compares a voltage level of the output power with a voltage level corresponding to a preset output power signal, and generate the second mode operation signal when the voltage level of the output power is less than or equal to the voltage level corresponding to the output power signal.

In an embodiment, the output power has a negative voltage level.

In an embodiment, the controller includes an interface unit configured to receive a register value controlling the switching controller, a frequency generation circuit configured to generate the frequency signal using a reference clock signal, and an output power controller configured to provide the output power signal to the mode selector.

In an embodiment, the switch unit is driven by any one of a first driving method of alternately turning on the first and second transistors in the first mode, a second driving method of alternately turning on the first and second transistors in a first period and simultaneously turning off the first and second transistors in a second period, and a third driving method of alternately turning on the first and second transistors in a (1-1)-th period and simultaneously turning off the first and second transistors in a (2-1)-th period longer than the second period.

In an embodiment, the switch unit is driven by the second driving method or the third driving method in the second mode.

In an embodiment, a turn-on breakdown voltage of the first transistor is a sum of a forwarding voltage, a maximum voltage of the input power, a minimum voltage of the output power, and an over transient voltage in the first driving method, and is a sum of the maximum voltage of the input power and the over transient voltage in the second and third driving methods.

In an embodiment, the switch unit sets the switching frequency as a reference frequency in the first mode and sets the switching frequency as a frequency lower than the reference frequency in the second mode.

In an embodiment, the switch unit controls the first and second transistors with a first slew rate in the first mode, and controls the first and second transistors with a second slew rate lower than the first slew rate in the second mode.

In an embodiment, a turn-off breakdown voltage of the first transistor is a sum of a maximum voltage of the input power, a minimum voltage of the output power, a forwarding voltage, and an under transient voltage, and a turn-off breakdown voltage of the second transistor is a sum of the maximum voltage of the input power, the minimum voltage of the output power, and an over transient voltage.

In an embodiment, a magnitude of an absolute value of the under transient voltage and the over transient voltage when controlling with the second slew rate may be lower than the magnitude of the absolute value of the under transient voltage and the over transient voltage when controlling with the first slew rate.

According to embodiments of the present disclosure, a display device includes a display panel including scan lines, a first power line, a second power line, and pixels connected to the scan lines and the first and second power lines, a scan driver configured to sequentially provide scan signals to the scan lines, and a power supply configured to convert input power into a first power voltage and a second power voltage, supply the first power voltage to the first power line, and supply the second power voltage to the second power line.

In an embodiment, the power supply includes a mode selector that compares a voltage level of the input power with a preset start voltage level, and generates a second mode operation signal converting a first mode to a second mode when the voltage level of the input power is greater than or equal to the start voltage level, and in the second mode, at least one of a driving method, a switching frequency, and a slew rate of the first transistor and the second transistor included in the power supply is variable compared to the first mode.

In an embodiment, the power supply may further include a switch unit including the first transistor disposed between an input terminal receiving the input power and a first node, an inductor disposed between the first node and a ground, and the second transistor disposed between the first node and an output terminal outputting the output power, and a switching controller configured to output a first control signal controlling the first transistor and a second control signal controlling the second transistor based on a control signal and a frequency signal received from a controller.

According to embodiments, by dynamically driving in a normal mode or an input voltage limitation mode in response to the voltage level of the input power, switching transistors included in the power supply may be designed based on the battery voltage range, and a withstand voltage of switching transistors may be withstood also in the adapter voltage range.

According to embodiments of the present disclosure, power consumption in the power supply may be decreased by designing the switching transistors based on the battery voltage range, and a Y-axis size of a printed circuit board on which the power supply device (for example, a PMIC) is mounted may be reduced.

BRIEF DESCRIPTION OF THE DRAWINGS

The above and other features of the present disclosure will become more apparent by describing in detail embodiments thereof with reference to the accompanying drawings, in which:

FIG. 5 is a flowchart illustrating an input voltage limitation mode entry condition according to an embodiment of the present disclosure;

FIGS. 6A and 6B are diagrams illustrating an operation of the power supply for each normal mode and input voltage limitation mode according to an embodiment of the present disclosure;

FIG. 7 is a table illustrating a type of a register value that an interface unit of FIG. 2 receives from outside of the interface unit according to an embodiment of the present disclosure;

FIGS. 8A to 8C are diagrams illustrating first to third driving methods of FIGS. 6A and 6B according to an embodiment of the present disclosure;

FIG. 10 is a table illustrating a turn-on minimum breakdown voltage Min. On BV, a turn-off minimum breakdown voltage Min. Off BV, and an on-resistance RSP for each type of an LDMOS according to an embodiment of the present disclosure;

DETAILED DESCRIPTION OF THE EMBODIMENTS

Figure 1:
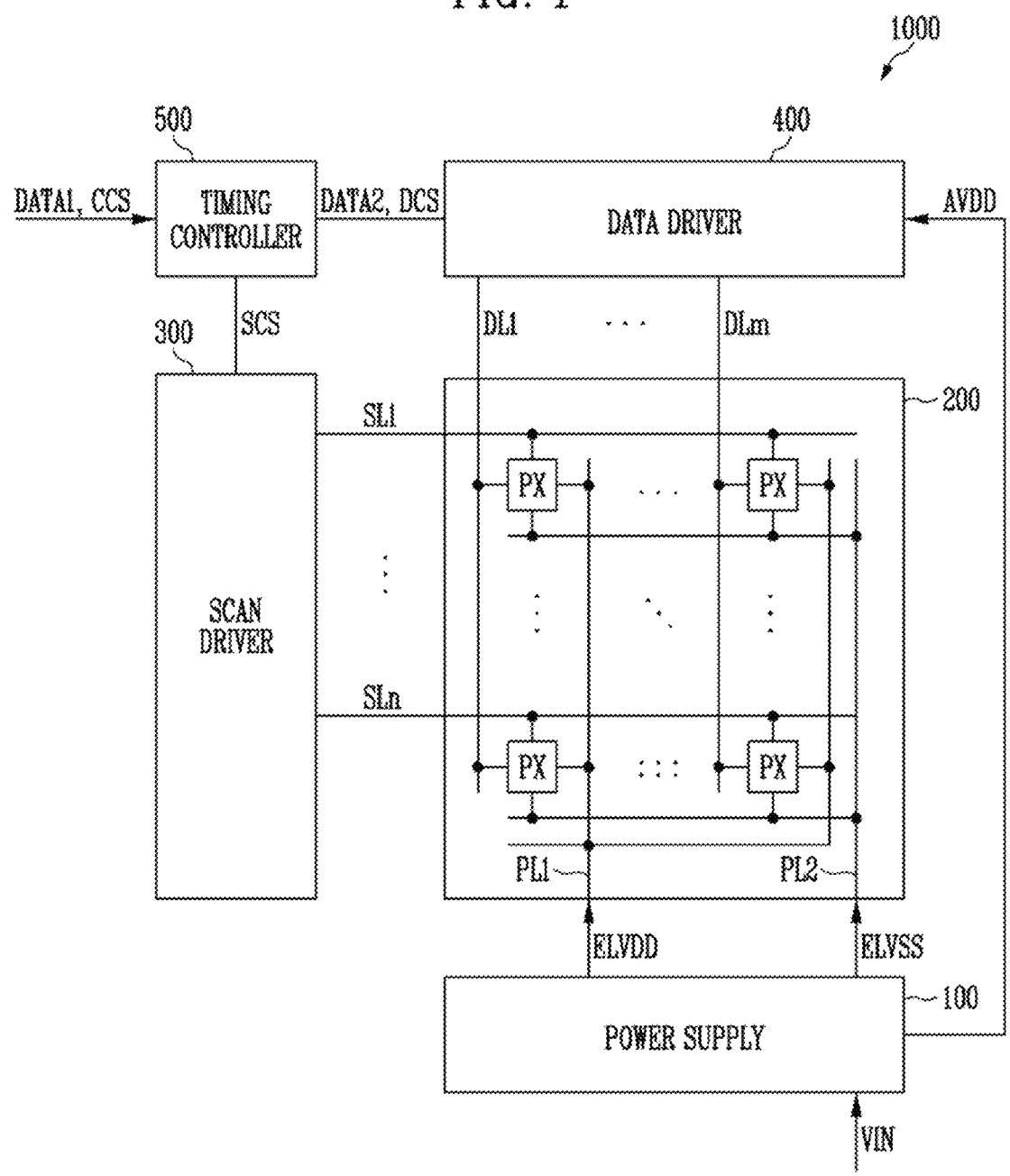
FIG. 1 is a block diagram illustrating a display device according to embodiments of the present disclosure.

Embodiments of the present disclosure will be described more fully hereinafter with reference to the accompanying drawings. Like reference numerals may refer to like elements throughout the accompanying drawings.

The word "about", as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

FIG. 1 is a block diagram illustrating a display device according to embodiments of the present disclosure.

Referring to FIG. 1, a display device 1000 may include a display panel 200, a scan driver 300, a data driver 400, a timing controller 500, and a power supply 100 (e.g., a power supply device).

The display panel 200 may include scan lines SL1 to SLn (where n is a positive integer), data lines DL1 to DLm (where m is a positive integer), and pixels PX. In addition, the display panel 200 may include a first power line PL1 and a second power line PL2.

The type of the display panel 200 is not particularly limited. For example, the display panel 200 may be a self-luminous display panel. In this case, the display panel 200 may include a plurality of light emitting elements. For example, the light emitting element may be selected as an organic light emitting diode. In addition, the light emitting element may be selected as an inorganic light emitting diode such as a micro light emitting diode (LED) or a quantum dot light emitting diode. In addition, the light emitting element may be an element configured of an organic material and an inorganic material.

Alternatively, the display panel 200 may be a non-emission display panel such as a liquid crystal display panel (LCD panel), an electrophoretic display panel (EPD panel), and an electro-wetting display panel (EWD panel). When the display panel 200 is the non-emission display panel, the display device 1000 may further include a backlight unit for supplying light to the display panel 200.

The pixel PX may be disposed in an area (for example, a pixel area) partitioned by the scan lines SL1 to SLn and the data lines DL1 to DLm.

The pixel PX may be connected to the first power line PL1, the second power line PL2, a corresponding one of the scan lines SL1 to SLn, and a corresponding one of the data lines DL1 to DLm. Hereinafter, "connection" may include not only an electrical connection, but also a physical connection, and may include not only a direct connection, but also an indirect connection through another component, unless the context clearly indicates otherwise.

The pixel PX may include a light emitting element and at least one transistor that provides a driving current to the light emitting element.

The pixel PX may emit light with a luminance corresponding to a data voltage (e.g., a data signal) provided through the data line in response to a scan signal provided through the scan line. For example, the pixel PX positioned in an n-th row and an m-th column may emit light with a luminance corresponding to a data voltage (e.g., a data signal) provided through the m-th data line DLm in response to a scan signal provided through the n-th scan line SLn.

The scan driver 300 may generate the scan signal based on a scan control signal SCS and sequentially provide the scan signal to the scan lines SL1 to SLn. The scan control signal SCS may include a scan start signal (e.g., a scan start pulse), scan clock signals, etc., and may be provided from the timing controller 500. For example, the scan driver 300 may include a shift register sequentially generating and outputting a pulse-shaped scan signal corresponding to a pulse-shaped scan start signal (for example, a pulse of a gate-on voltage level) using the scan clock signals.

The data driver 400 generates data voltages (e.g., data signals) based on image data DATA2 and a data control signal DCS provided from the timing controller 500, and provides the data voltages to the data lines DL1 to DLm. The data control signal DCS may be a signal controlling an operation of the data driver 400, and may include a load signal (e.g., a data enable signal) instructing an output of an effective data voltage.

For example, the data driver 400 may generate a data voltage corresponding to a data value (e.g., a grayscale value) included in the image data DATA2 using gamma voltages. The gamma voltages may be generated in the data driver 400 or may be provided from a separate gamma voltage generation circuit (for example, a gamma integrated circuit). For example, the data driver 400 may select one of the gamma voltages based on the data value and output the selected one as the data signal.

The timing controller 500 may receive input image data DATA1 and a control signal CCS from outside of the timing controller 500 (for example, an application processor), and generate the scan control signal SCS and the data control signal DCS based on the control signal CCS. The control signal CCS may include, for example a vertical synchronization signal, a horizontal synchronization signal, a clock signal, etc. In addition, the timing controller 500 may convert the input image data DATA1 to generate the image data DATA2. For example, the timing controller 500 may convert the input image data DATA1 into the image data DATA2 having a format usable by the data driver 400.

In FIG. 1, the scan driver 300, the data driver 400, and the timing controller 500 are configured independently of each other, but this is only an example, and embodiments of the present disclosure are not limitation thereto. For example, at least one of the scan driver 300, the data driver 400, and the timing controller 500 may be formed on the display panel 200, or may be implemented as an integrated circuit (IC), mounted on a flexible circuit board, and connected to the display panel 200. For example, the scan driver 300 may be formed on the display panel 200. In addition, at least two of the scan driver 300, the data driver 400, and the timing controller 500 may be implemented as one IC.

The power supply 100 (e.g., power supply device) according to an embodiment of the present disclosure may generate a first power voltage ELVDD using input power VIN and supply the first power voltage ELVDD to the first power line PL1, and generate a second power voltage ELVSS and supply the second power voltage ELVSS to the second power line PL2. The first power voltage ELVDD and the second power voltage ELVSS may be voltages utilized for an operation of the pixel PX, and the first power voltage ELVDD may have a voltage level higher than a voltage level of the second power voltage ELVSS.

For example, the power supply 100 may be implemented as a power management integrated circuit (PMIC), and may convert the input power VIN into each of the first power voltage ELVDD and the second power ELVSS through a switching operation for transistors provided therein.

In addition, the power supply 100 may generate a third power voltage AVDD using the input power VIN and provide third power voltage AVDD to the data driver 400. The third power voltage AVDD is a voltage utilized for driving the data driver 400 (for example, generation of the gamma voltages).

The power supply 100 may manage magnitudes and sequence of source voltages ELVDD, ELVSS, and AVDD provided to the display panel 200 and the data driver 400 based on the input power VIN. For example, the first power voltage ELVDD and the second power voltage ELVSS may be a positive voltage and a negative voltage utilized for driving the pixels PX, and the third power voltage AVDD may be a voltage utilized for driving the data driver 400.

In an embodiment, the power supply 100 may implement a converter that converts a voltage of the input power VIN into the first power voltage ELVDD and a converter that converts the voltage of the input power VIN into the third power voltage AVDD as a boost converter, and implement a converter that converts the voltage of the input power VIN into the second power voltage ELVSS as an inverting buck boost converter. At this time, since the inverting buck boost converter outputs the second power voltage ELVSS, which is the negative voltage, as an output power, a difference between the input power VIN and the output power may be large. Therefore, a voltage (e.g., a withstand voltage) applied to transistors M1 and M2 of FIG. 3 included in the inverting buck boost converter (e.g., the power supply 100) may be large.

The display device 1000 according to an embodiment may be an electronic device such as a smartphone and a notebook computer. When the display device 1000 is a notebook computer, the display device 1000 may have a battery voltage range (for example, about 5.5V to about 17.6V) and an adapter voltage range (for example, about 18V to about 22V) higher than the battery voltage range.

Therefore, when selecting a transistor included in the inverting buck boost converter (e.g., the power supply 100) in consideration of the high adapter voltage range, a lateral double-diffused MOSFET (LDMOS) having a large capacity may be used. Since an on-resistance of the high-capacity transistor is large, a size of the high-capacity transistor is large, and efficiency is also reduced. Therefore, power consumption of the display device 1000 may be increased, and a Y-axis size of a printed circuit board on which the power supply device (for example, the PMIC) is mounted may be increased.

In an embodiment, the power supply 100 may be driven in a normal mode (e.g., a first mode) when the input power VIN corresponds to the low battery voltage range (for example, about 5.5V to about 17.6V), and may be driven in an input voltage limitation mode (e.g., a second mode) when the input power VIN corresponds to the adapter voltage range (for example, about 18V to about 22V) higher than the battery voltage range. For example, in an embodiment, the input power VIN has a positive voltage level, and has a battery voltage range and an adapter voltage range grater than the battery voltage range.

Figure 3:
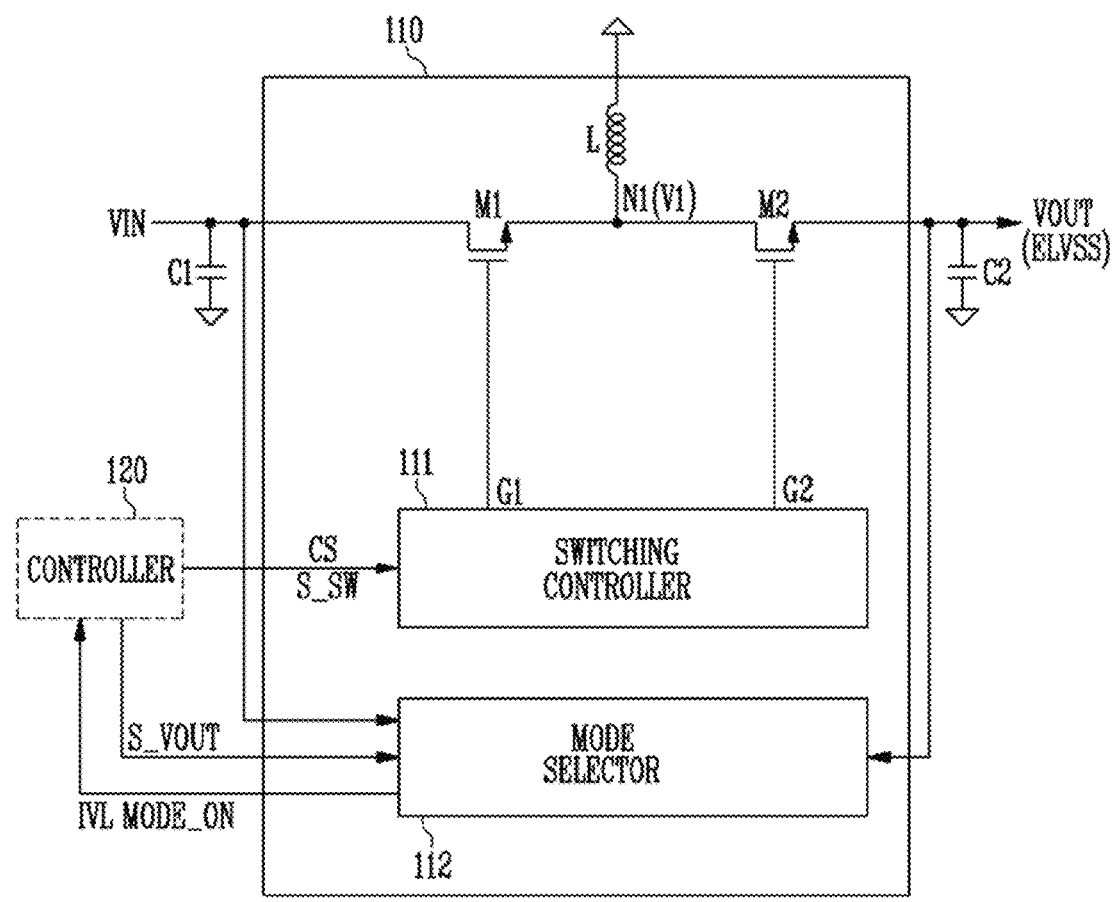
FIG. 3 is a block diagram illustrating a DC-DC converter according to an embodiment of the present disclosure.

When the power supply 100 is driven in the input voltage limitation mode, the power supply 100 may decrease the voltage (e.g., the withstand voltage) applied to the transistors M1 and M2 of FIG. 3 by varying at least one of an off-duty (or an on-duty, or a driving method) of the transistors M1 and M2 of FIG. 3 in the power supply 100, a switching frequency of the transistors M1 and M2 of FIG. 3, and a slew rate of a switching control signal for the transistors M1 and M2 of FIG. 3. The off-duty may mean a ratio at which the transistors M1 and M2 of FIG. 3 are turned off while the transistors M1 and M2 of FIG. 3 are switched, the switching frequency may mean the number of times the transistors are turned on or turned off per unit time, the slew rate of the switching control signal may be defined as a slope at an edge (for example, a rising edge and a falling edge) of the switching control signal, and the slew rate of the switching control signal may be expressed as a time utilized for state conversion between a turn-on state and a turn-off state (that is, a time conversion utilized time, or a transition time) of the transistors M1 and M2 of FIG. 3.

For example, when the power supply 100 is driven in the input voltage limitation mode, the power supply 100 may increase the off-duty of the transistors M1 and M2 of FIG. 3, decrease the switching frequency of the transistors, and decrease the slew rate of the switching control signal for the transistors M1 and M2 of FIG. 3 (e.g., increase the transition time), compared to the normal mode. When the slew rate is decreased, the transition time may be increased, and a magnitude of a transient voltage generated in a transition process of the transistors M1 and M2 of FIG. 3 may be decreased.

As described above, since the power supply 100 according to an embodiment of the present disclosure may be driven in the input voltage limitation mode decreasing the voltage (e.g., the withstand voltage) applied to the transistors M1 and M2 of FIG. 3 in the power supply 100, in the high adapter voltage range (for example, about 18V to about 22V), the power supply 100 may be designed as a small-sized LDMOS (for example, a 20V LDMOS) suitable for the low battery voltage range (for example, about 5.5V to about 17.6V). Accordingly, since the on-resistance of the transistors M1 and M2 of FIG. 3 is decreased, efficiency of a case where the power supply 100 is driven by charge power supplied from a battery other than normal time power may be increased.

Hereinafter, a condition in which the power supply 100 is driven in the input voltage limitation mode and a method of decreasing the voltage (e.g., the withstand voltage) applied to the transistors M1 and M2 of FIG. 3 included in the power supply 100 in the input voltage limitation mode will be described in detail.

Figure 2:
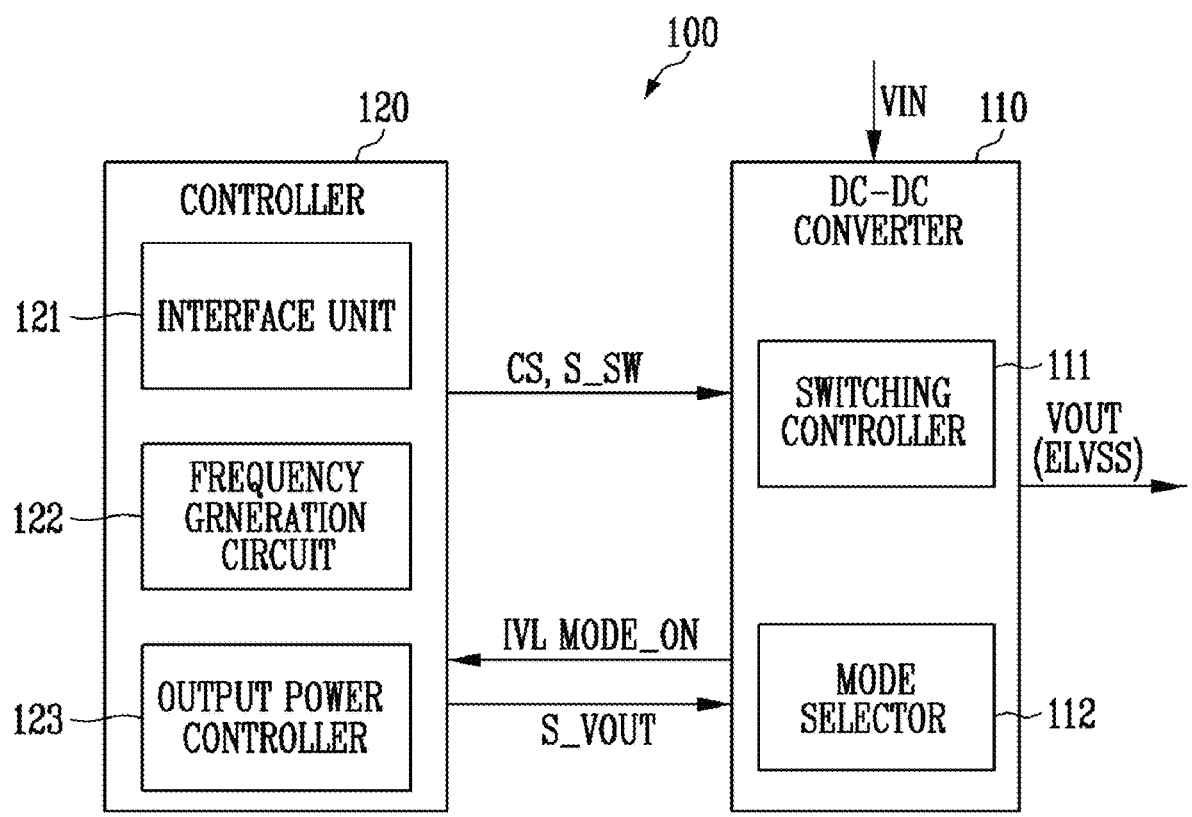
FIG. 2 is a block diagram illustrating an example of a power supply included in the display device of FIG. 1 according to embodiments of the present disclosure.

FIG. 2 is a block diagram illustrating an example of the power supply included in the display device of FIG. 1 according to embodiments of the present disclosure.

For convenience of description, the power supply 100 is described based on a converter that converts the voltage of the input power VIN into the second power voltage ELVSS and outputs the second power voltage ELVSS as output power VOUT.

Referring to FIG. 2, the power supply 100 may include a DC-DC converter 110 and a controller 120.

The DC-DC converter 110 may include a switch unit (for example, a transistor, an inductor, etc.), a switching controller 111 that controls on/off operations of the switch unit, and a mode selector 112 that determines whether to drive in the normal mode or the input voltage limitation mode. The switch unit may also be referred to as a switch or a switch circuit, the switching controller 111 may also be referred to as a switching controller circuit, and the mode selector 112 may also be referred to as a mode selector circuit.

The DC-DC converter 110 may convert the input power VIN into the second power voltage VSS. For example, the DC-DC converter 110 may be implemented as an inverting buck converter, and may generate the second power voltage VSS as the output power VOUT by dropping a voltage level of the input power VIN. A detailed configuration of the DC-DC converter 110 is described further with reference to FIG. 3.

The controller 120 may include an interface unit 121 that receives data from outside of the controller 120, and a frequency generation circuit 122 that supplies a frequency signal S_SW to the switching controller 111. In addition, the controller 120 may further include an output power controller 123 that supplies an output power signal S_VOUT to the mode selector 112.

The interface unit 121 receives data (for example, a register value) for controlling the DC-DC converter 110 (or the switching controller 111) from outside of the interface unit 121, and transmits a control signal CS to the DC-DC converter 110 based on whether an input voltage limitation mode operation signal IVL MODE_ON (e.g., a second mode operation signal) is received from the mode selector 112. At this time, the control signal CS may include register values received from outside of the controller 120 shown in a table of FIG. 7.

The DC-DC converter 110 may vary at least one of the off-duty (or the driving method) of the transistors M1 and M2 of FIG. 3 in the DC-DC converter 110, the switching frequency of the transistors, and the slew rate of the switching control signal for the transistors M1 and M2 of FIG. 3 by the control signal CS.

According to an embodiment, the interface unit 121 may perform communication in an I2C (inter-integrated circuit) method. Such an I2C communication method may change a function in software without changing hardware, and may support a one-to-many communication function. The I2C interface may communicate using two wires of a serial data (SDA) wire and a serial clock (SCL) wire. However, embodiments of the present disclosure are not limited thereto, and the interface unit 121 may perform data communication using various known interface methods.

The frequency generation circuit 122 may generate a frequency signal S_SW using a reference clock signal received from outside of the frequency generation circuit 122, and supply the frequency signal S_SW to the DC-DC converter 110 (or the switching controller 111).

According to an embodiment, the frequency generation circuit 122 may supply different frequency signals S_SW to the DC-DC converter 110 according to whether the input voltage limitation mode operation signal IVL MODE_ON is received.

For example, when the frequency generation circuit 122 does not receive the input voltage limitation mode operation signal IVL_MODE_ON (that is, in the normal mode), the frequency generation circuit 122 may generate and output a first frequency signal having a first switching frequency, and when the frequency generation circuit 122 receives the input voltage limitation mode operation signal IVL MODE_ON (that is, in the input voltage limitation mode), the frequency generation circuit 122 may generate and output a second frequency signal having a second switching frequency. The second switching frequency may be less than the first switching frequency.

The output power controller 123 may supply an output power signal S_VOUT for determining whether to start the mode conversion determination to the mode selector 112. The output power controller 123 may generate the output power signal S_VOUT based on the register values IVL_LV and IVL_LV2 of FIG. 7 regarding a voltage level of the output power VOUT received from the interface unit 121. The output power signal S_VOUT may include information on a preset reference voltage.

According to an embodiment, the mode selector 112 may start a determination of whether to convert a mode based on actually detected output power VOUT and the output power signal S_VOUT. For example, in a case where the output power signal S_VOUT has a value corresponding to about −7V, when the output power VOUT is about −7V or less, the mode selector 112 may start the determination of whether to convert the mode.

Figure 4:
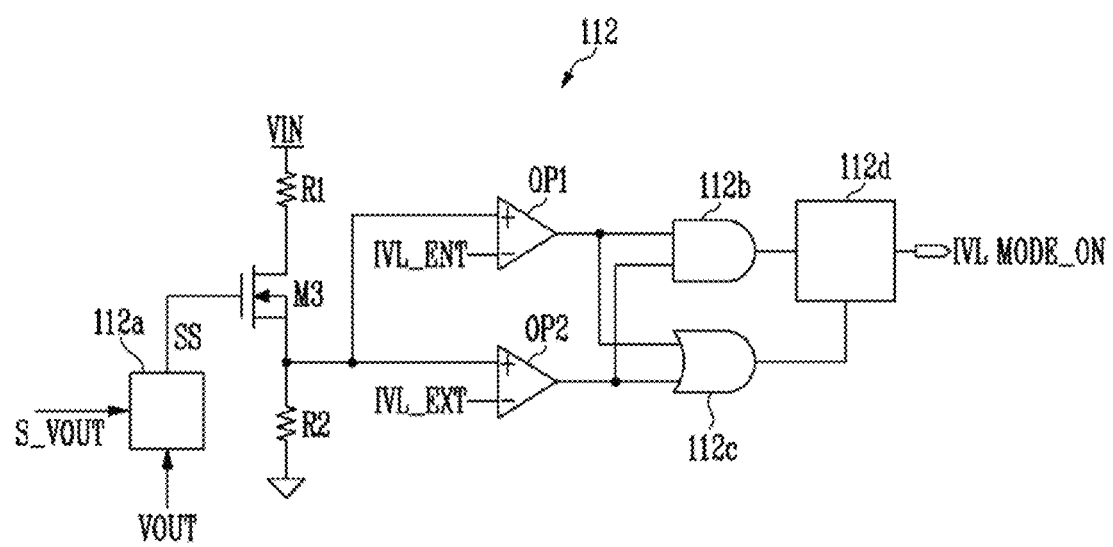
FIG. 4 is a diagram illustrating an internal configuration of a mode selector 112 according to an embodiment of the present disclosure.

FIG. 3 is a block diagram illustrating a DC-DC converter according to an embodiment of the disclosure. FIG. 4 is a diagram illustrating an internal configuration of a mode selector 112 according to an embodiment of the disclosure. FIG. 5 is a flowchart illustrating an input voltage limitation mode entry condition according to an embodiment of the present disclosure.

Referring to FIGS. 2 and 3, the DC-DC converter 110 may include the switch unit, the switching controller 111, and the mode selector 112. The switch unit may include an inductor L, the first transistor M1, and the second transistor M2.

The DC-DC converter 110 may convert the input power VIN and output the second power voltage ELVSS as the output power VOUT.

The inductor L may be connected between a first node N1 and ground. The second power voltage ELVSS may be controlled based on an inductor current flowing through the inductor L.

The first transistor M1 may be connected between an input terminal providing the input power VIN and the first node N1. The first transistor M1 may be turned on by receiving a first control signal G1 from the switching controller 111, and may control the current to flow through the inductor L. A first capacitor C1 may be disposed between the input terminal and the first transistor M1.

The second transistor M2 may be connected between the first node N1 and an output terminal outputting the output power VOUT. The second transistor M2 may be turned on by receiving a second control signal G2 from the switching controller 111. A second capacitor C2 may be disposed between the output terminal and the second transistor M2.

Therefore, after the first transistor M1 is turned on and electromotive force is generated in the inductor L, the second transistor M2 may be turned on to convert the input power VIN into the second power voltage ELVSS and output the second power voltage ELVSS as the output power VOUT. The first node N1 may be defined as a common node of the first transistor M1, the second transistor M2, and the inductor L.

The switching controller 111 may control on/off of the first transistor M1 and the second transistor M2 based on the control signal CS and/or the frequency signal S_SW. For example, the first and second transistors M1 and M2 may be alternately turned on and off by control of the switching controller 111.

The mode selector 112 may determine whether to operate in the input voltage limitation mode (e.g., the second mode). According to an embodiment, the mode selector 112 may start sensing of the input power VIN when a magnitude of a voltage of the output power VOUT is less than or equal to a magnitude of the preset reference voltages IVL_LV and IVL_LV2 of FIG. 7. Thereafter, when the voltage level of the sensed input power VIN is greater than or equal to a level of a preset start voltage IVL_ENT of FIGS. 4 and 7, the mode selector 112 may output the input voltage limitation mode operation signal IVL MODE_ON, and when the voltage level of the input power VIN is less than or equal to a level of a preset end voltage IVL_EXT of FIGS. 4 and 7, the mode selector 112 may step the output of the input voltage limitation mode operation signal IVL MODE_ON. The start voltage may be greater than the end voltage.

Referring to FIG. 4, the mode selector 112 according to an embodiment may include a first resistor R1, a second resistor R2, a third transistor M3, a first comparator OP1, a second comparator OP2, a first determiner 112a, an AND operator 112b, an OR operator 112c, and a second determiner 112d.

The third transistor M3 may be disposed between the input power VIN and the ground. The first resistor R1 may be disposed between the input power VIN and a first electrode of the third transistor M3, and the second resistor R2 may be disposed between a second electrode of the third transistor M3 and the ground.

A gate electrode of the third transistor M3 may be connected to an output terminal of the first determiner 112a. The first determiner 112a may receive the output power VOUT and the output power signal S_VOUT, and compare a magnitude of a voltage of the output power VOUT with a magnitude of a voltage corresponding to the output power signal S_VOUT, and output an input power sensing signal SS when the magnitude of the voltage of the output power VOUT is less than or equal to the magnitude of the voltage corresponding to the output power signal S_VOUT. As described above, the output power signal S_VOUT may include information on the preset reference voltage IVL_LV and IVL_LV2 of FIG. 7.

The second electrode of the third transistor M3 may be connected to a first input terminal (e.g., a non-inverting terminal) of the first comparator OP1 and a first input terminal (e.g., a non-inverting terminal) of the second comparator OP2. The start voltage IVL_ENT may be connected to a second input terminal (e.g., an inverting terminal) of the first comparator OP1, and the end voltage IVL_EXT may be connected to a second input terminal (e.g., an inverting terminal) of the second comparator OP2. The first and second comparators OP1 and OP2 may be operational amplifiers.

An output terminal of the first comparator OP1 may be connected to a first input terminal of the AND operator 112b and a first input terminal of the OR operator 112c. An output terminal of the second comparator OP2 may be connected to a second input terminal of the AND operator 112b and a second input terminal of the OR operator 112c.

An output terminal of the AND operator 112b and an output terminal of the OR operator 112c may be connected to the second determiner 112d. The second determiner 112d may be, for example, a flip-flop circuit.

Referring to FIG. 5, the power supply 100 may start a series of sequence processes shown in FIG. 5 when the input voltage limitation mode operation signal IVL Enable is '0'. The power supply 100 may receive an enable signal '1' before receiving the limitation mode operation signal IVL Enable, and may be in a power-on state.

The DC-DC converter 110 may compare the voltage level of the output power VOUT and the voltage level corresponding to the output power signal S_VOUT (S10).

When the voltage level of the output power VOUT exceeds the voltage level corresponding to the output power signal S_VOUT, the DC-DC converter 110 may perform operation S10 of comparing the voltage levels again. The output power signal S_VOUT may include the information on the preset reference voltage IVL_LV and IVL_LV2 of FIG. 7. The first determiner 112a shown in FIG. 4 may compare the voltage level of the actual output power VOUT provided from the output terminal and the voltage level corresponding to the output power signal S_VOUT provided from the controller 120.

When the voltage level of the output power VOUT is less than or equal to the voltage level corresponding to the output power signal S_VOUT, the DC-DC converter 110 may start sensing for detecting the voltage level of the input power VIN (S20).

The first determiner 112a shown in FIG. 4 may provide the input power sensing signal SS to the gate electrode of the third transistor M3 when the voltage level of the output power VOUT is less than or equal to the voltage level corresponding to the output power signal S_VOUT. The input power sensing signal SS may be a signal for turning on the third transistor M3.

The DC-DC converter 110 may compare the voltage level of the input power VIN and the level of the start voltage IVL_ENT (S30).

The first comparator OP1 shown in FIG. 4 may receive the input power VIN through the first input terminal and receive the start voltage IVL_ENT through the second input terminal. The first comparator OP1 may output a logic high level when the voltage level of the input power VIN is greater than or equal to the level of the start voltage IVL_ENT, and output a logic low level when the voltage level of the input power VIN is less than the level of the start voltage IVL_ENT.

The DC-DC converter 110 may end the input voltage limitation mode (e.g., the second mode) when the magnitude of the voltage of the input power VIN is less than the start voltage IVL_ENT. In other words, the DC-DC converter 110 may be driven in the normal mode when the magnitude of the voltage of the input power VIN is less than the start voltage IVL_ENT.

The DC-DC converter 110 may be driven in the input voltage limitation mode (e.g., the second mode) when the magnitude of the voltage of the input power VIN is greater than or equal to the start voltage IVL_ENT (S40).

When the second determiner 112d shown in FIG. 4 receives a logic high level from both of the AND operator 112b (also referred to as an AND logic circuit) and the OR operator 112c (also referred to as an OR logic circuit), the second determiner 112d may output the input voltage limitation mode operation signal IVL MODE_ON.

The DC-DC converter 110 may compare the voltage level of the input power VIN and a level of the end voltage IVL_EXT (S50).

The second comparator OP2 shown in FIG. 4 may receive the input power VIN through the first input terminal and receive the end voltage IVL_EXT through the second input terminal. The second comparator OP2 may output a logic high level when the voltage level of the input power VIN is greater than or equal to the level of the end voltage IVL_EXT, and output a logic low level when the voltage level of the input power VIN is less than the level of the end voltage IVL_EXT.

The DC-DC converter 110 may maintain the input voltage limitation mode (e.g., the second mode) when the voltage level of the input power VIN is greater than or equal to the level of the end voltage IVL_EXT. When the second determiner 112d shown in FIG. 4 receives a logic low level from the AND operator 112b and a logic high level from the OR operator 112c, the second determiner 112d may output the input voltage limitation mode operation signal IVL MODE_ON.

The DC-DC converter 110 may end the input voltage limitation mode (e.g., the second mode) when the voltage level of the input power VIN is less than or equal to the level of the end voltage IVL_EXT.

When the second determiner 112d shown in FIG. 4 receives a logic low level from both of the AND operator 112b and the OR operator 112c, the second determiner 112d may stop the output of the input voltage limitation mode operation signal IVL MODE_ON.

Figure 6B:
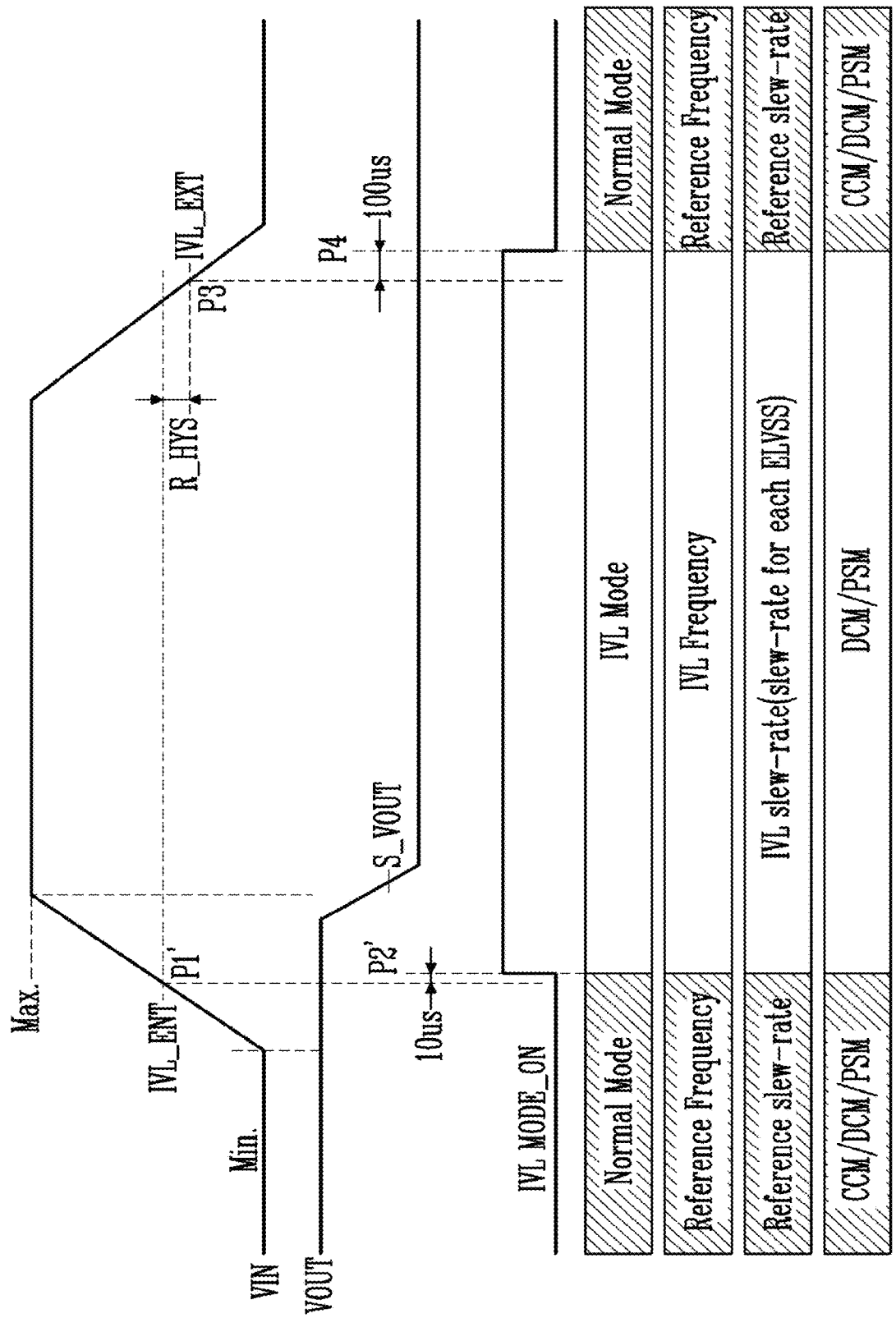

FIGS. 6A and 6B are diagrams illustrating an operation of the power supply for each normal mode and input voltage limitation mode according to an embodiment of the present disclosure. FIG. 7 is a table illustrating a type of the register value that the interface unit of FIG. 2 receives from outside of the interface unit according to an embodiment of the present disclosure.

Referring to FIG. 6A, the power supply 100 may be dynamically driven in the normal mode or the input voltage limitation mode based on the voltage levels of the input power VIN and the output power VOUT. The power supply 100 may be driven in the normal mode when the input power VIN corresponds to the low battery voltage range (for example, about 5.5V to about 17.6V), and may be driven in the input voltage limitation mode when the input power VIN corresponds to the adapter voltage range (for example, about 18V to about 22V) greater than the battery voltage range. According to an embodiment, the mode selector 112 of FIG. 2 does not generate the input voltage limitation mode operation signal IVL MODE_ON (e.g., the second mode operation signal) in the battery voltage range.

First, the operation of the power supply 100 in the normal mode (e.g., the first mode) will be described.

Firstly, the power supply 100 may set a switching speed as a reference frequency. For example, the reference frequency may be about 1.5 MHz. However, embodiments of the present disclosure are not limitation thereto.

Secondly, the power supply 100 may set the slew rate as a reference slew rate. Thirdly, the power supply 100 may generate the second power voltage ELVSS by operating the DC-DC converter 110 in any one of the first driving method, the second driving method, and the third driving method. For example, the first driving method may be a continuous-conduction mode (hereinafter, CCM) shown in FIG. 8A, the second driving method may be a discontinuous conduction mode (hereinafter, DCM) shown in FIG. 8B, and the third driving method may be a pulse skip mode (hereinafter, PSM) shown in FIG. 8C.

Next, the operation of the power supply 100 in the input voltage limitation mode (e.g., the second mode) will be described.

Firstly, the power supply 100 may set the switching speed as a frequency lower than the reference frequency of the normal mode. For example, an input voltage limitation mode frequency may be any one of about 450 kHz, about 600 kHz, about 750 kHz, and about 900 kHz.

Secondly, the power supply 100 may set the slew rate as an input voltage limitation mode slew rate lower than the reference slew rate of the normal mode. The input voltage limitation mode slew rate may be set for each second power voltage ELVSS. For example, as a level of the second power supply voltage ELVSS decreases, the input voltage limitation mode slew rate may decrease (e.g., the transition time may increase).

Thirdly, the power supply 100 may generate the second power voltage ELVSS by operating the DC-DC converter 110 in the second driving mode or the third driving mode.

As described above, the power supply 100 may prepare conversion from the normal mode into the input voltage limitation mode when the voltage level of the input power VIN is greater than or equal to the level of the start voltage IVL_ENT and the voltage level of the output power VOUT is less than or equal to the voltage level corresponding to the output power signal S_VOUT, that is, at a first time point P1. At this time, the output power signal S_VOUT may include the information on the preset reference voltages IVL_LV and IVL_LV2 of FIG. 7.

Referring to FIG. 6A, in an embodiment, the power supply 100 may perform conversion from the normal mode into the input voltage limitation mode at a time point at which a first buffer period elapses from the first time point P1, that is, at a second time point P2. For example, the first buffer period may be about 10 μs. When the first buffer period is set, frequent mode conversion may be prevented.

The input voltage limitation mode operation signal IVL MODE_ON indicating on/off of the input voltage limitation mode may change from a logic low level to a logic high level at the second time point P2.

At a third time point P3, the voltage level of the input power VIN may be less than or equal to the level of the end voltage IVL_EXT. In this case, the power supply 100 may prepare mode conversion from the input voltage limitation mode to the normal mode. The level of the end voltage IVL_EXT may be less than the level of the start voltage IVL_ENT by a preset value. A period between the start voltage IVL_ENT and the end voltage IVL_EXT may be defined as a hysteresis period R_HYS, and according to embodiments, the mode conversion is not performed in the hysteresis period R_HYS. When the hysteresis period is set, frequent mode conversion may be prevented.

Similar to the second time point P2, the power supply 100 may perform conversion from the input voltage limitation mode into the normal mode at a time point at which a second buffer period elapses from the third time point P3, that is, at a fourth time point P4. The input voltage limitation mode operation signal IVL MODE_ON may change from a logic high level to a logic low level at the fourth time point P4.

Referring to FIG. 6B, in an embodiment, the power supply 100 may determine whether to convert from the normal mode to the input voltage limitation mode based only on the magnitude of the input power VIN.

The power supply 100 may perform conversion from the normal mode into the input voltage limitation mode at a time point at which the voltage level of the input power VIN is less than or equal to the level of the start voltage IVL_ENT, that is, at a time point at which the first buffer period elapses from a first time point P1', that is, at a second time point P2'. For example, the first buffer period may be about 10 μs. When the first buffer period is set, frequent mode conversion may be prevented.

The input voltage limitation mode operation signal IVL MODE_ON indicating on/off of the input voltage limitation mode may change from a logic low level to a logic high level at the second time point P2'. Since a remaining configuration of FIG. 6B may be substantially the same as that of the embodiment shown in FIG. 6A, a repetitive description is omitted for convenience of explanation.

Referring to FIGS. 2 and 7, the power supply 100 may receive the register values from outside of the power supply 100 (for example, from an application processor) through the interface unit 121.

The register values may include a set value for the input voltage limitation mode operation signal IVL Enable, a set value for an input voltage limitation mode option IVL option, a set value related to the start voltage IVL_ENT, a set value related to the end voltage IVL_EXT, a set value related to a first voltage level IVL_LV of the output power, a set value related to a second voltage level IVL_LV2 of the output power, a set value related to a first slew rate IVL1 Slew-rate, a set value related to a second slew rate IVL2 Slew-rate, a set value related to the first and second buffer periods IVL deglith time, and a set value related to an input voltage limitation mode switching frequency IVL Frequency.

According to an embodiment, the set value for the input voltage limitation mode operation signal IVL Enable may be expressed by 1 bit. For example, when the set value for the input voltage limitation mode operation signal IVL Enable is 0, the power supply 100 may start the series of sequence processes shown in FIG. 5, and when the set value for the input voltage limitation mode operation signal IVL Enable is 1, the power supply 100 may end the series of sequence processes shown in FIG. 5.

According to an embodiment, the set value for the input voltage limitation mode option IVL option may be expressed by 1 bit. For example, when the set value for the input voltage limitation mode option IVL option is 0, the power supply 100 may consider a condition in which the voltage level of the input power VIN is greater than or equal to the level of the start voltage IVL_ENT and the voltage level of the output power VOUT is less than or equal to a level of the first reference voltage IVL_LV as a start condition of the input voltage limitation mode, and when the set value for the input voltage limitation mode option IVL option is 1, the power supply 100 may consider only a condition in which the voltage level of the input power VIN is greater than or equal to the level of the start voltage IVL_ENT as the start condition of the input voltage limitation mode.

According to an embodiment, the set value related to the start voltage IVL_ENT may be expressed by 2 bits. For example, when the set value related to the start voltage IVL_ENT is 00, the start voltage IVL_ENT may be about 18.5V, when the set value related to the start voltage IVL_ENT is 01, the start voltage IVL_ENT may be about 19V, when the set value related to the start voltage IVL_ENT is 10, the start voltage IVL_ENT may be about 19.5V, and when the set value related to the start voltage IVL_ENT is 11, the start voltage IVL_ENT may be about 20V.

According to an embodiment, the set value related to the end voltage IVL_EXT may be expressed by 2 bits. For example, when the set value related to the end voltage IVL_EXT is 00, the end voltage IVL_EXT may be about 17.5V, when the set value related to the end voltage IVL_EXT is 01, the end voltage IVL_EXT may be about 18V, when the set value related to the end voltage IVL_EXT is 10, the end voltage IVL_EXT may be about 18.5V, and when the set value related to the end voltage IVL_EXT is 11, the end voltage IVL_EXT may be about 19V.

According to an embodiment, the set value related to a first voltage level IVL_LV1 of the output power may be expressed by 2 bits. For example, when the set value related to the first voltage level IVL_LV1 of the output power is 00, the first voltage level IVL_LV1 of the output power may be about −7.0V, when the set value related to the first voltage level IVL_LV1 of the output power is 01, the first voltage level IVL_LV1 of the output power may be about −7.5V, when the set value related to the first voltage level IVL_LV1 of the output power is 10, the first voltage level IVL_LV1 of the output power may be about −8V, and when the set value related to the first voltage level IVL_LV1 of the output power is 11, the first voltage level IVL_LV1 of the output power may be about −8.5V.

According to an embodiment, the set value related to the second voltage level IVL_LV2 of the output power may be expressed by 2 bits. For example, when the set value related to the second voltage level IVL_LV2 of the output power is 00, the second voltage level IVL_LV2 of the output power may be about −7V, when the set value related to the second voltage level IVL_LV2 of the output power is 01, the second voltage level IVL_LV2 of the output power may be about −7.5V, when the set value related to the second voltage level IVL_LV2 of the output power is 10, the second voltage level IVL_LV2 of the output power may be about −8V, and when the set value related to the second voltage level IVL_LV2 of the output power is 11, the second voltage level IVL_LV2 of the output power may be about −8.5V.

According to an embodiment, the set value related to the first slew rate IVL1 Slew-rate may be expressed by 2 bits. For example, when the set value related to the first slew rate IVL1 Slew-rate is 00, the first slew rate IVL1 Slew-rate may be the fastest step, when the set value related to the first slew rate IVL1 Slew-rate is 01, the first slew rate IVL1 Slew-rate may be a fast step, when the set value related to the first slew rate IVL1 Slew-rate is 10, the first slew rate IVL1 Slew-rate may be a slow step, and when the set value related to the first slew rate IVL1 Slew-rate is 11, the first slew rate IVL1 Slew-rate may be the slowest step. At this time, the power supply 100 may apply the first slew rate IVL1 Slew-rate when the voltage level of the output power VOUT is less than or equal to the first voltage level IVL_LV1.

According to an embodiment, the set value related to the second slew rate IVL2 Slew-rate may be expressed by 2 bits. For example, when the set value related to the second slew rate IVL2 Slew-rate is 00, the second slew rate IVL2 Slew-rate may be the fastest step, when the set value related to the second slew rate IVL2 Slew-rate is 01, the second slew rate IVL2 Slew-rate may be a fast step, when the set value related to the second slew rate IVL2 Slew-rate is 10, the second slew rate IVL2 Slew-rate may be a slow step, and when the set value related to the second slew rate IVL2 Slew-rate is 11, the second slew rate IVL2 Slew-rate may be the slowest step. At this time, the power supply 100 may apply the second slew rate IVL2 Slew-rate when the voltage level of the output power VOUT is less than or equal to the second voltage level IVL_LV2.

According to an embodiment, the set value related to the first buffer period IVL1 deglith time may be expressed by 2 bits. For example, when the set value related to the first buffer period IVL1 deglith time is 00, the first buffer period IVL1 deglith time may be about 0 μs, when the set value related to the first buffer period IVL1 deglith time is 01, the first buffer period IVL1 deglith time may be about 10 μs, when the set value related to the first buffer period IVL1 deglith time is 10, the first buffer period IVL1 deglith time may be about 50 μs, and when the set value related to the first buffer period IVL1 deglith time is 11, the first buffer period IVL1 deglith time may be about 100 μs.

According to an embodiment, the set value related to the second buffer period IVL2 deglith time may be expressed by 2 bits. For example, when the set value related to the second buffer period IVL2 deglith time is 00, the second buffer period IVL2 deglith time may be about 0 μs, when the set value related to the second buffer period IVL2 deglith time is 01, the second buffer period IVL2 deglith time may be about 100 μs, when the set value related to the second buffer period IVL2 deglith time is 10, the second buffer period IVL2 deglith time may be about 500 μs, and when the set value related to the second buffer period IVL2 deglith time is 11, the second buffer period IVL2 deglith time may be about 1000 μs.

According to an embodiment, the set value related to the input voltage limitation mode switching frequency IVL Frequency may be expressed by 2 bits. For example, when the set value related to the input voltage limitation mode switching frequency IVL Frequency is 00, the input voltage limitation mode switching frequency IVL Frequency may be about 450 kHz, when the set value related to the input voltage limitation mode switching frequency IVL Frequency is 01, the input voltage limitation mode switching frequency IVL Frequency may be about 600 kHz, when the set value related to the input voltage limitation mode switching frequency IVL Frequency is 10, the input voltage limitation mode switching frequency IVL Frequency may be about 750 kHz, and when the set value related to the input voltage limitation mode switching frequency IVL Frequency is 11, the input voltage limitation mode switching frequency IVL Frequency may be about 900 kHz.

Figure 8B:
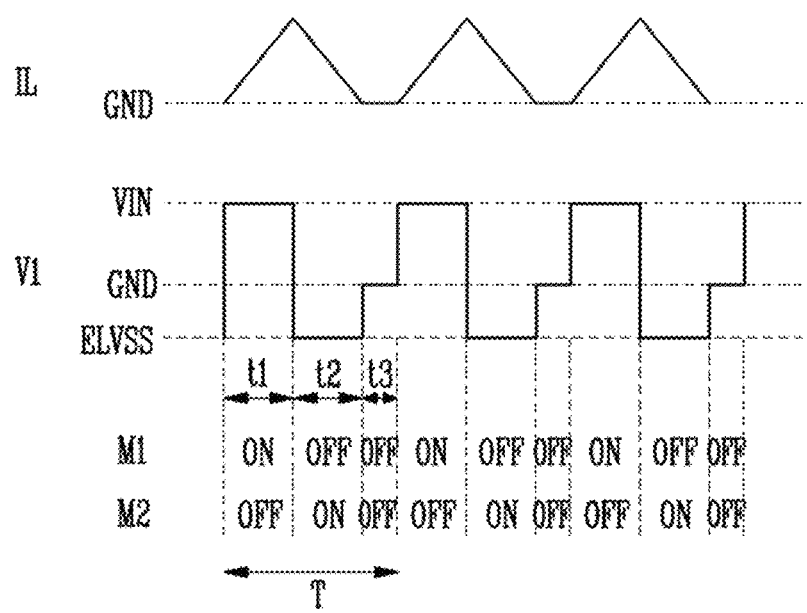
Figure 8C:
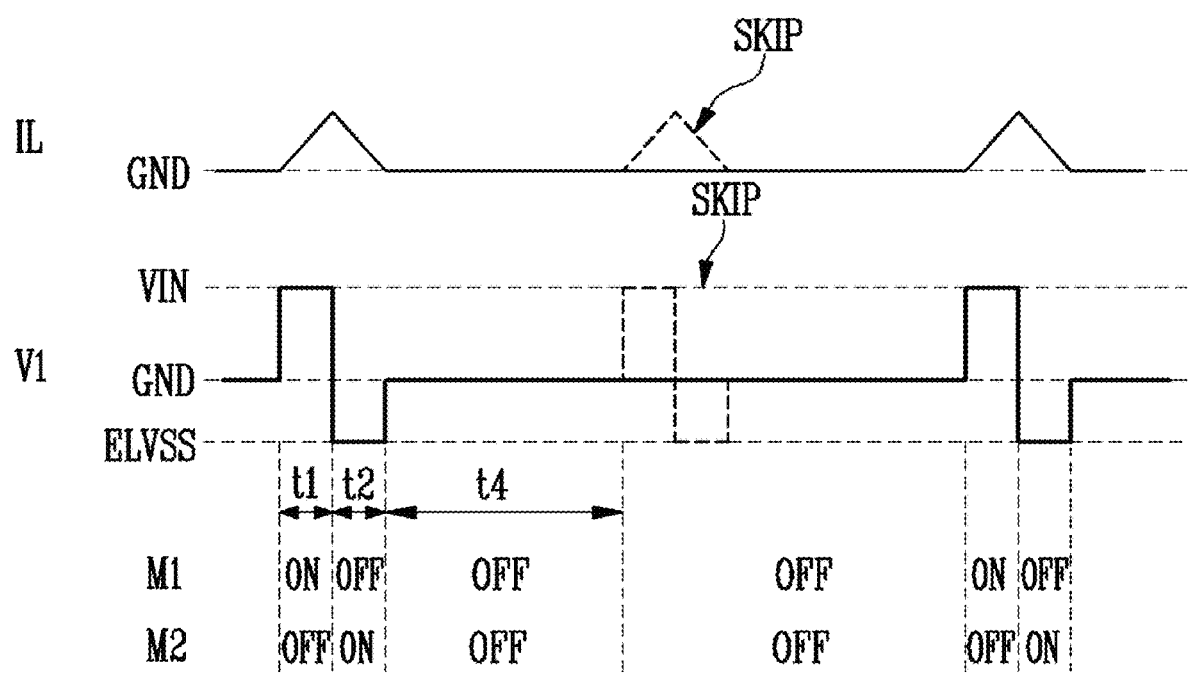

FIGS. 8A to 8C are diagrams illustrating the first to third driving methods of FIGS. 6A and 6B according to an embodiment of the present disclosure.

Referring to FIGS. 3 and 8A, the first driving method may generate an inductor current IL by alternately turning on the first and second transistors M1 and M2. As shown in FIG. 8A, the first and second transistors M1 and M2 may be repeatedly turned on and off in a predetermined switching period T. For example, a turn-on state of the first transistor M1 and a turn-on state of the second transistor M2 do not overlap during the first period t1.

When the first transistor M1 is turned on (t1), electromotive force may be generated in the inductor L. Therefore, a voltage V1 of the first node may have the voltage level of the input power VIN, and a magnitude of the inductor current IL may increase by a level difference between the voltage V1 of the first node and a ground voltage GND.

When the first transistor M1 is turned off and the second transistor M2 is turned on (t2), a counter electromotive force may be generated in the inductor L. Therefore, the voltage V1 of the first node may fall and have the level of the second power voltage ELVSS, and the magnitude of the inductor current IL may decrease by a level difference between the ground voltage GND and the voltage V1 of the first node.

Such a switching period T may be repeated, and the magnitude of the inductor current IL may be continuously changed. For example, the first driving method may be a CCM driving method. The first driving method may minimize or reduce output ripple and thus have high output stability.

As shown in FIG. 8B, the second driving method may include a period in which the first and second transistors M1 and M2 are simultaneously turned off in one switching period T (hereinafter, a first discontinuous period, t3). At this time, the first node voltage V1 may maintain the ground voltage GND level. Since one end of the first inductor L1 is opened, a current maintains the ground voltage GND level, and the inductor current IL does not change during the first discontinuous period t3. In addition, an amplitude of the inductor current IL may be less than that of the first driving method. For example, a peak value of the inductor current IL in the second driving method may be less than a peak value of the inductor current IL in the first driving method. For example, the first driving method may be a DCM driving method.

In the first driving method, the number of times of switching (the number of times the turn-on occurs) of the first and second transistors M1 and M2 may be reduced as a size of a driving frequency decreases based on the same time. Therefore, power loss due to a parasitic capacitance according to the number of times of switching of the first and second transistors M1 and M2 may be decreased.

As shown in FIG. 8C, the third driving method may include a second discontinuous period t4 in which the first and second transistors M1 and M2 are simultaneously turned off in one switching period. A length of the second discontinuous period t4 may be longer than that of the first discontinuous period t3. In an embodiment, the third driving method may skip some switching periods. In this case, in an embodiment, the switching of the first and second transistors M1 and M2 may be skipped, and the inductor current IL does not flow. Accordingly, the amplitude of the inductor current IL may also be less than that of the second driving method. For example, the third driving method may be a PSM driving method.

Based on the same time, since the third driving method skips a switching operation of the first and second transistors M1 and M2 in a predetermined period, the total number of times of switching (the number of times the turn-on occurs) may be reduced. Therefore, power loss due to the parasitic capacitance according to the number of times of switching of the first and second transistors M1 and M2 may be decreased.

According to an embodiment, the switch unit may be driven by any one of the first driving method including alternately turning on the first and second transistors M1 and M2 in the first mode, the second driving method including alternately turning on the first and second transistors M1 and M2 in the first period t1 and simultaneously turning off the first and second transistors M1 and M2 in the second period t2, and the third driving method of alternately turning on the first and second transistors M1 and M2 in a (1-1)-th period and simultaneously turning off the first and second transistors M1 and M2 in a (2-1)-th period longer than the second period.

Figure 9:
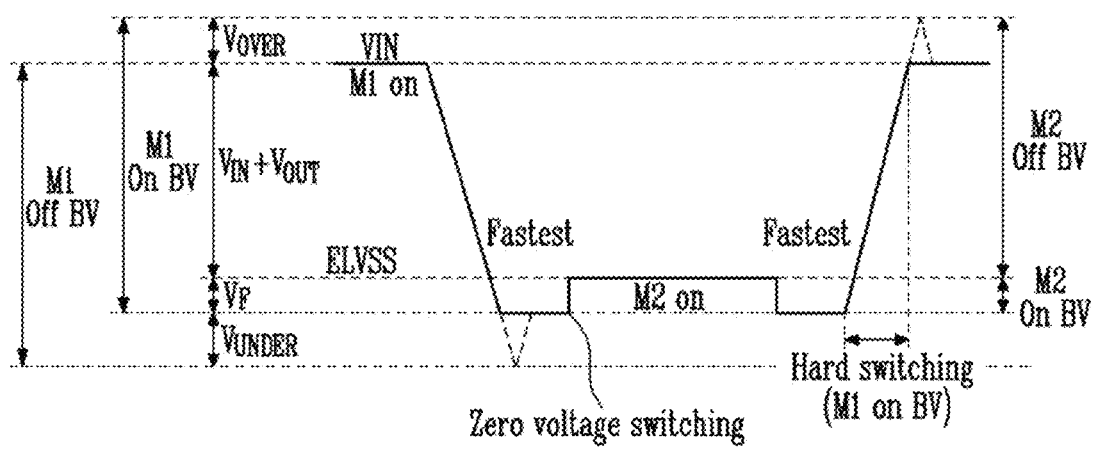
FIG. 9 is a diagram illustrating a withstand voltage applied to each of transistors included in the DC-DC converter of FIG. 3 according to an embodiment of the present disclosure.

FIG. 9 is a diagram illustrating a withstand voltage applied to each of the transistors included in the DC-DC converter of FIG. 3 according to an embodiment of the present disclosure. FIG. 10 is a table illustrating a turn-on minimum breakdown voltage Min. On BV, a turn-off minimum breakdown voltage Min. Off BV, and an on-resistance RSP for each type of an LDMOS according to an embodiment of the present disclosure.

Hereinafter, for convenience of description, the disclosure is described based on an embodiment in which the DC-DC converter 110 of FIG. 3 operates in the first driving method (for example, CCM) shown in FIG. 8A as an example. According to an embodiment, the first transistor M1 may be turned on/off through hard switching, and the second transistor M2 may be turned on/off through zero voltage switching (e.g., soft switching). In this case, the second transistor M2 may further include a diode connected between a source electrode and a drain electrode.

Referring to FIGS. 3, 8A, and 9, when the first transistor M1 is turned on, the withstand voltage applied to both ends of the first transistor M1 may be a sum of a forwarding voltage VF, the voltage of the input power VIN, the voltage of the output power VOUT, and an over transient voltage VOVER.

When the first transistor M1 is turned off, the withstand voltage applied to both ends of the first transistor M1 may be a sum of the forwarding voltage VF, the voltage of the input power source VIN, the voltage of the output power VOUT, and an under transient voltage VUNDER.

When the second transistor M2 is turned on, the withstand voltage applied to both ends of the second transistor M2 may be the forwarding voltage VF.

When the second transistor M2 is turned off, the withstand voltage applied to both ends of the second transistor M2 may be a sum of the voltage of the input power VIN, the voltage of the output power VOUT, and the over transient voltage VOVER.

For example, the voltage of the input power VIN may be 22V, and the voltage of the output power VOUT (that is, the second power voltage ELVSS) may be about −8V. That is, the input power VIN may correspond to the adapter voltage range (for example, about 18V to about 22V). In addition, the forwarding voltage VF of the second transistor M2 may be about 0.5V, the over transient voltage VOVER may be about 6.6V, and the under transient voltage VUNDER may be about −6.6V. In this case, the turn-on breakdown voltage M1 On BV of the first transistor M1 may be about 37.1 V, the turn-off breakdown voltage M1 Off BV of the first transistor M1 may be about 37.1 V, the turn-on breakdown voltage M2 On BV of the second transistor M2 may be about 0.5V, and the turn-off breakdown voltage M2 Off BV of the second transistor M2 may be about 36.6V.

When considering the above-described condition, selection of a 30V LDMOS may be requested as the first transistor M1 and the second transistor M2 of the DC-DC converter 110. The 30V LDMOS has a size increase compared to a 12V LDMOS and a 24V LDMOS because the on-resistance RSP is large, and a power consumption increase is inevitable because efficiency is also reduced.

As described above, the power supply 100 according to an embodiment of the disclosure may be driven in the input voltage limitation mode (e.g., the second mode) through voltage level sensing, in the high adapter voltage range (for example, about 18V to about 22V). When the power supply 100 is driven in the input voltage limitation mode, the power supply 100 may decrease the voltage (e.g., the withstand voltage) applied to the transistors by varying at least one of the off-duty (or the driving method) of the transistors in the power supply 100, the switching frequency of the transistors, and the slew rate of the switching control signal.

Figure 11:
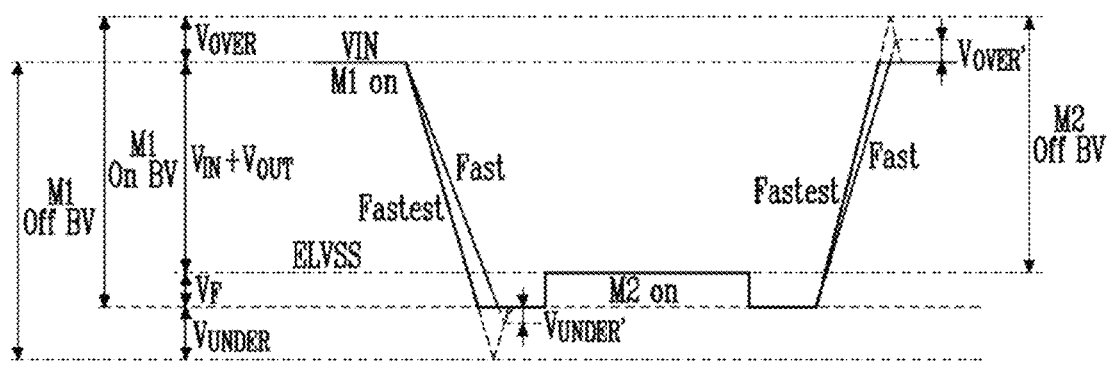
FIG. 11 is a diagram illustrating an embodiment in which a slew rate of a switching control signal for the transistors in the power supply is varied.

FIG. 11 is a diagram illustrating an embodiment in which the slew rate of the switching control signal for the transistors in the power supply is varied. The slew rate of the fastest step shown in FIG. 11 may be substantially the same as the slew rate of the switching control signal of the first transistor M1 shown in FIG. 9.

Referring to FIGS. 3, 9, and 11, when a control signal of the first transistor M1 has the slew rate of the fastest step, the under transient voltage VUNDER may be about −6.6V, but when the switching control signal has the slew rate of the fast step, an under transient voltage VUNDER' may decrease to about −2V. In this case, the turn-off breakdown voltage M1 On BV of the first transistor M1 may decrease from about 37.1V to about 32.5V.

In addition, when a control signal of the second transistor M2 has the slew rate of the fastest step, the over transient voltage VOVER may be about 6.6 V, but when the switching control signal of the second transistor M2 has the slew rate of the fast step, an over transient voltage VOVER' may decrease to about 2V. In this case, the turn-off breakdown voltage M2 On BV of the second transistor M2 may decrease from about 36.6V to about 32V.

Referring to the table shown in FIG. 10, in consideration of the above-described condition, selection of the 20V LDMOS may be possible as the first transistor M1 and the second transistor M2 included in the switch unit of the DC-DC converter 110.

Figure 12:
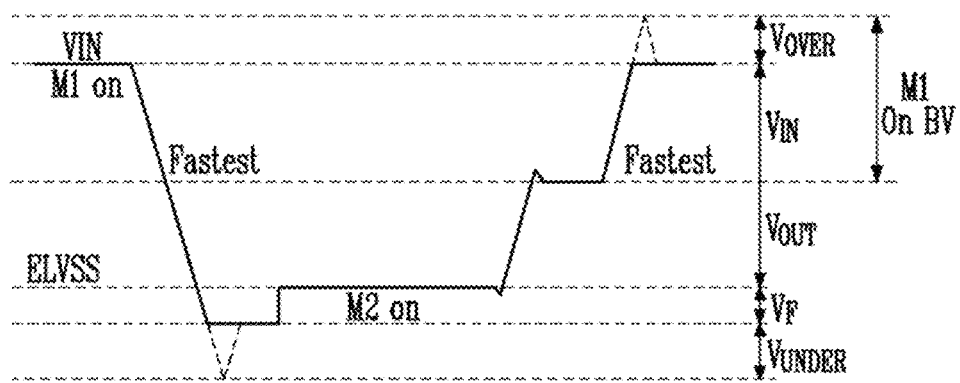
FIG. 12 is a diagram illustrating an embodiment in which an off-duty (or a driving method) of the transistors in the power supply is changed.

FIG. 12 is a diagram illustrating an embodiment in which the off-duty (or the driving method) of the transistors in the power supply is changed. In FIG. 12, the second driving method (that is, the DCM) is described as a reference, and the third driving method (that is, PSM) may expect substantially the same effect as the second driving method (that is, a decrease of the turn-on breakdown voltage M1 On BV of the first transistor M1).

Referring to FIGS. 3, 8B, and 9, when the power supply 100 operates in the first driving method (that is, the CCM), the turn-on breakdown voltage M1 On BV of the first transistor M1 may be the sum of the forwarding voltage VF, the maximum voltage of the input power VIN, the minimum voltage of the output power VOUT, and the over transient voltage VOVER. Referring to FIGS. 3, 8B, and 12, when the power supply 100 operates in the second driving method (that is, the DCM), since a period t3 of FIG. 8B in which the first and second transistors M1 and M2 are simultaneously turned on is included, the first transistor M1 is turned on at a level of the ground voltage GND. Therefore, the turn-on breakdown voltage M1 On BV of the first transistor M1 may be a sum of the voltage of the input power VIN and the over transient voltage VOVER.

Therefore, when the power supply 100 operates in the first driving method (that is, the CCM), the turn-on breakdown voltage M1 On BV of the first transistor M1 may be about 37.1 V, but when the power supply 100 operates in the second driving method (that is, the DCM), the turn-on breakdown voltage M1 On BV of the first transistor M1 may decrease to about 28.6V.

Referring to the table shown in FIG. 10, in consideration of the above-described condition, selection of the 24V LDMOS may be possible as the first transistor M1 and the second transistor M2 included in the switch unit of the DC-DC converter 110.

Figure 13:
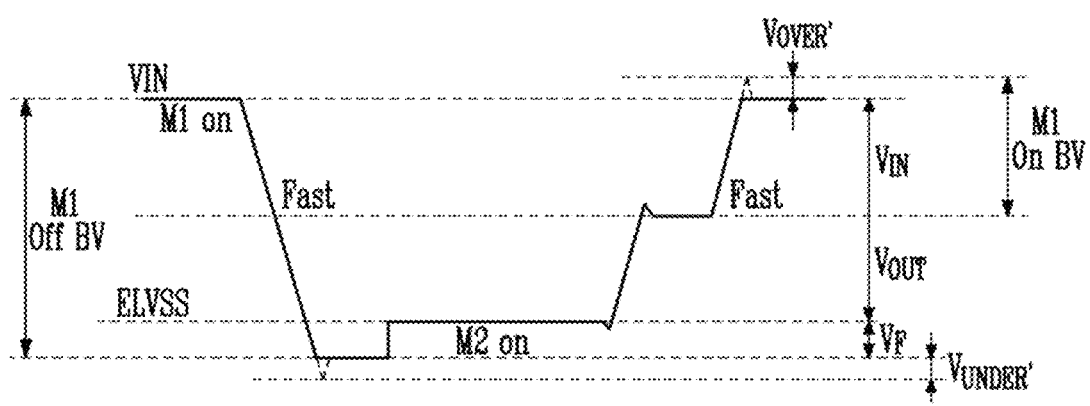
FIG. 13 is a diagram illustrating an embodiment in which both of the slew rate of the switching control signal for the transistors in the power supply and the off-duty (or the driving method) of the transistors in the power supply are changed.

FIG. 13 is a diagram illustrating an embodiment in which both of the slew rate of the switching control signal for the transistors in the power supply and the off-duty (or the driving method) of the transistors in the power supply are changed.

The embodiment shown in FIG. 13 is different from the embodiment shown in FIG. 12 in which the switching control signal of the first and second transistors M1 and M2 has the slew rate of the fastest step, in that the switching control signal of the first and second transistors M1 and M2 has the slew rate of the fast step, and a remaining configuration is substantially the same.

Therefore, as shown in FIG. 12, when the power supply 100 operates in the slew rate of the fastest step and the second driving method (that is, the DCM), the over transient voltage VOVER is about 6.6V, and the turn-on breakdown voltage M1 On BV of the first transistor M1 may be about 28.6 V. However, as shown in FIG. 13, when the power supply 100 is driven in the slew rate of the fast step and the second driving method (that is, the DCM), since an over transient voltage VOVER' decreases to about 2V, the turn-on breakdown voltage M1 On BV of the first transistor M1 may decrease to about 24V.

Referring to the table shown in FIG. 10, in consideration of the above-described condition, selection of the 20V LDMOS may be possible as the first transistor M1 and the second transistor M2 included in the switch unit of the DC-DC converter 110.

As described above, when the power supply 100 is driven in the input voltage limitation mode (e.g., the second mode), the voltage (e.g., the withstand voltage) may be decreased, by selecting any one of the off-duty (or the driving method) of the transistors in the power supply 100, the switching frequency of the transistors, and the slew rate of the switching control signal for the transistors and varying selected one alone. However, when two or all of the off-duty (or the driving method) of the transistors in the power supply 100, the switching frequency of the transistors, and the slew rate of the switching control signal for the transistors are varied, the voltage (e.g., the withstand voltage) applied to the first and second transistors M1 and M2 may be more effectively decreased.

Figure 14:
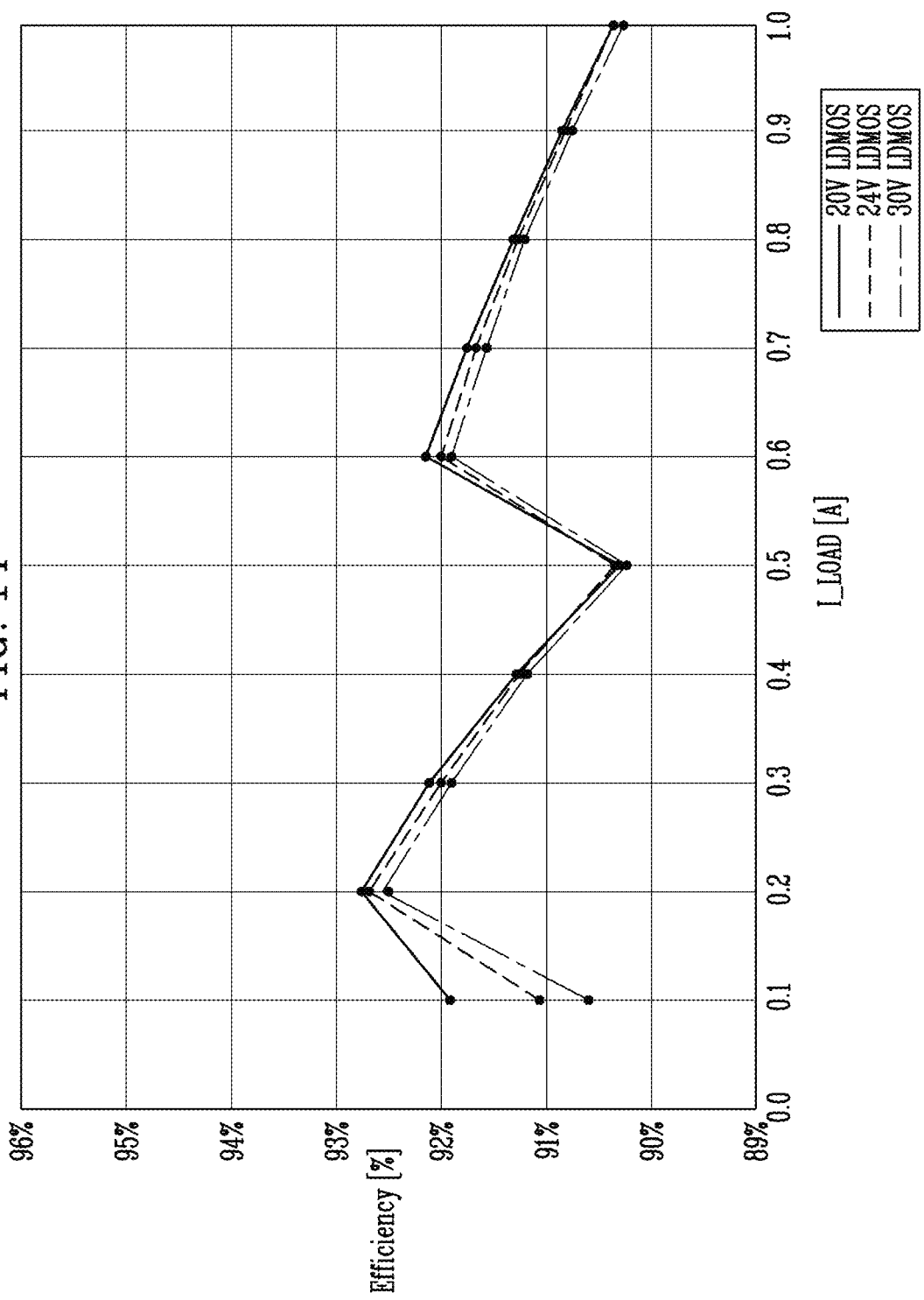
FIG. 14 is a graph illustrating an effect of the disclosure.

FIG. 14 is a graph illustrating an effect according to embodiments of the present disclosure.

Referring to FIGS. 3 and 14, as the first and second transistors M1 and M2 included in the power supply 100 are implemented with an LDMOS of a smaller capacity, efficiency is increased in the entire load area, an effect that power consumption of the power supply 100 (e.g., the display device 1000 of FIG. 1) may be expected. The efficiency may be defined as a ratio of the input power VIN of the power supply 100 to the output power VOUT. In a process of converting from the input power VIN to the output power VOUT, the efficiency may be decreased as loss increases. For example, referring to FIG. 10, the on-resistance RSP of the 30V LDMOS may be about 16 mΩ/mm$^2$, and the on-resistance RSP of the 20V LDMOS may be about 8 mΩ/mm$^2$. Since the on-resistance RSP of the 20V LDMOS is halved compared to the on-resistance RSP of the 30V LDMOS, an efficiency increase of a heavy load area may be realized.

In addition, as the first and second transistors M1 and M2 included in the power supply 100 are implemented with the LDMOS of a smaller capacity, the area occupied by the LDMOS decreases, and thus, space efficiency and a production cost reduction effect may be realized.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A power supply device, comprising:
a switch unit including a first transistor disposed between an input terminal that receives input power and a first node, an inductor disposed between the first node and a ground, and a second transistor disposed between the first node and an output terminal that outputs output power;
a switching controller configured to operate in a first driving method of alternately turning on the first and second transistors based on a control signal and a frequency signal received from a controller in a first mode; and
a mode selector configured to supply a second mode operation signal that converts from the first mode to a second mode in which at least one of a driving method, a switching frequency, and a slew rate of the first transistor and the second transistor is variable compared to the first mode to the controller,
wherein the mode selector compares a voltage level of the input power with a preset start voltage level, and generates the second mode operation signal to cause a change in at least one of the driving method, the switching frequency, and the slew rate of the first transistor and the second transistor, when the voltage level of the input power is greater than or equal to the start voltage level.

2. The power supply device of claim 1, wherein the input power has a positive voltage level, and has a battery voltage range and an adapter voltage range greater than the battery voltage range.

3. The power supply device of claim 2, wherein the battery voltage range is about 5.5V to about 17.6V, and the adapter voltage range is about 18V to about 22V.

4. The power supply device of claim 2, wherein the mode selector does not generate the second mode operation signal in the battery voltage range.

5. The power supply device of claim 1, wherein the mode selector compares the voltage level of the input power with a preset end voltage level, and stops the second mode operation signal when the voltage level of the input power is less than or equal to the end voltage level.

6. The power supply device of claim 5, wherein the start voltage level is greater than the preset end voltage level.

7. The power supply device of claim 5, wherein the mode selector generates the second mode operation signal after a first buffer period when the voltage level of the input power is greater than or equal to the start voltage level, and stops the second mode operation signal after a second buffer period when the voltage level of the input power is less than or equal to the preset end voltage level.

8. The power supply device of claim 7, wherein the first buffer period is shorter than the second buffer period.

9. The power supply device of claim 1, wherein the mode selector further compares a voltage level of the output power with a voltage level corresponding to a preset output power signal, and generates the second mode operation signal when the voltage level of the output power is less than or equal to the voltage level corresponding to the preset output power signal.

10. The power supply device of claim 9, wherein the output power has a negative voltage level.

11. The power supply device of claim 1, wherein the controller comprises:
an interface unit configured to receive a register value that controls the switching controller;
a frequency generation circuit configured to generate the frequency signal using a reference clock signal; and
an output power controller configured to provide an output power signal to the mode selector.

12. The power supply device of claim 1, wherein the switching controller are configured to operate in a second driving method of alternately turning on the first and second transistors in a first period and simultaneously turning off the first and second transistors in a second period in the second mode, or
wherein the switching controller are configured to operate in a third driving method of alternately turning on the first and second transistors in a (1-1)-th period and simultaneously turning off the first and second transistors in a (2-1)-th period longer than the second period in the second mode.

13. The power supply device of claim 12, wherein a turn-on breakdown voltage of the first transistor is a sum of a forwarding voltage, a maximum voltage of the input power, a minimum voltage of the output power, and an over transient voltage in the first driving method, and is a sum of the maximum voltage of the input power and the over transient voltage in the second and third driving methods.

14. The power supply device of claim 1, wherein the switch unit sets the switching frequency as a reference frequency in the first mode and sets the switching frequency as a frequency lower than the reference frequency in the second mode.

15. The power supply device of claim 1, wherein the switch unit controls the first and second transistors with a first slew rate in the first mode, and controls the first and second transistors with a second slew rate lower than the first slew rate in the second mode.

16. The power supply device of claim 15, wherein a turn-off breakdown voltage of the first transistor is a sum of a maximum voltage of the input power, a minimum voltage of the output power, a forwarding voltage, and an under transient voltage, and a turn-off breakdown voltage of the second transistor is a sum of the maximum voltage of the input power, the minimum voltage of the output power, and an over transient voltage.

17. The power supply device of claim 16, wherein a magnitude of an absolute value of the under transient voltage and the over transient voltage when the switch unit controls the first and second transistors with the second slew rate is lower than the magnitude of the absolute value of the under transient voltage and the over transient voltage when the switch unit controls the first and second transistors with the first slew rate.

18. The power supply device of claim 1, wherein a voltage of the first node has a voltage level of the input power when the first transistor is turned on and the second transistor is turned off.

19. The power supply device of claim 1, wherein the voltage of the first node has a voltage level of the output power when the first transistor is turned off and the second transistor is turned.

20. An electronic device, comprising:
a display device; and
a power supply device,
wherein the power supply device comprises:
a switch unit including a first transistor disposed between an input terminal that receives input power and a first node, an inductor disposed between the first node and a ground, and a second transistor disposed between the first node and an output terminal that outputs output power;
a switching controller configured to operate in a first driving method of alternately turning on the first and second transistors based on a control signal and a frequency signal received from a controller in a first mode; and
a mode selector configured to supply a second mode operation signal that converts from the first mode to a second mode in which at least one of a driving method, a switching frequency, and a slew rate of the first transistor and the second transistor is variable compared to the first mode to the controller,
wherein the mode selector compares a voltage level of the input power with a preset start voltage level, and generates the second mode operation signal to cause a change in at least one of the driving method, the switching frequency, and the slew rate of the first transistor and the second transistor, when the voltage level of the input power is greater than or equal to the start voltage level.

* * * * *